Dec. 11, 1923.                    1,477,447
T. RITCHIE
STOCK WATERER
Filed June 19, 1922        2 Sheets-Sheet 1

Inventor
Thomas Ritchie
By Geo. P. Kimmel
Attorney

Dec. 11, 1923.                                                     1,477,447
T. RITCHIE
STOCK WATERER
Filed June 19, 1922                           2 Sheets-Sheet 2

Inventor
Thomas Ritchie
By Geo. F. Kimmel
Attorney

Patented Dec. 11, 1923.

1,477,447

UNITED STATES PATENT OFFICE.

THOMAS RITCHIE, OF OSKALOOSA, IOWA.

STOCK WATERER.

Application filed June 19, 1922. Serial No. 569,252.

*To all whom it may concern:*

Be it known that I, THOMAS RITCHIE, a citizen of the United States, residing at Oskaloosa, in the county of Mahaska and State of Iowa, have invented certain new and useful Improvements in Stock Waterers, of which the following is a specification.

This invention relates to stock watering devices of the class wherein the water is maintained at a uniform stage or level in the troughs by the action of a float actuated valve in the supply tank, and has for one of its objects to improve the construction and increase the efficiency and utility of devices of this character.

Another object of the invention is to provide a device of this character having an improved construction of the body of the trough and supply tank, whereby the water supply is protected from contamination or the entrance therein of foreign matter.

With these and other objects in view the invention consists in certain novel features of construction as hereinafter shown and described and then specifically pointed out in the claim, and in the drawings illustrative of the preferred embodiment of the invention:—

Figure 1:
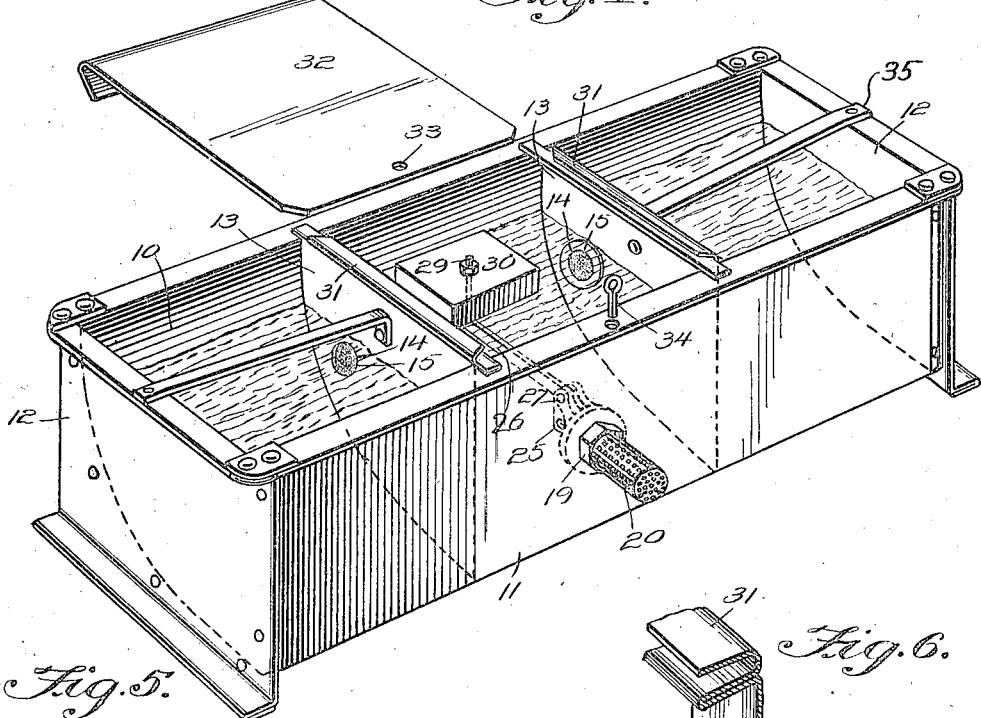
Figure 1 is a perspective view of the improved device, with the cover of the supply tank detached.
Figure 5:
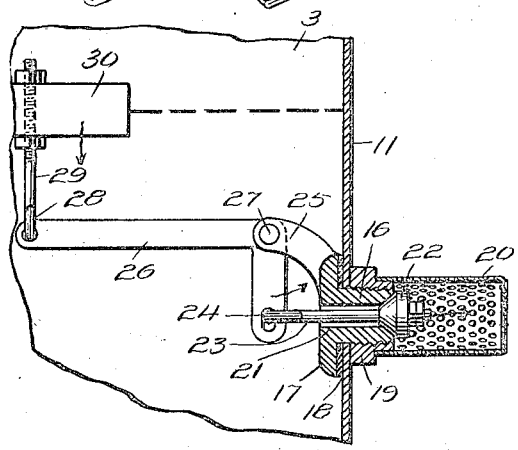
Fig. 5 is an enlarged sectional detail illustrating the construction of the float controlled valve.

The improved device includes a shell or body having a combined curved bottom and side 10, a vertical side 11, and vertical ends 12.

The interior of the body is provided with spaced transverse partitions 13 dividing the shell into three separate compartments, a central supply tank and two flanking drinking troughs or compartments.

The partitions 13 are each provided with a transverse opening 14 covered by a screen 15, the openings being spaced a considerable distance above the bottom of the shell, or a short distance below the normal water line in the tank, so that water from near the top of the supply only will pass from the tank or supply chamber to the troughs. By this means sediment of any kind which may accumulate in the troughs will not pass into the tank compartment.

Extending through the vertical wall 11 of the shell and within the supply compartment is an externally threaded plug 16 having a laterally directed flange 17 at the inner end and extending over the adjacent portion of the material of the side 11, with a packing 18 to produce a water tight joint.

Engaging over the threaded portion of the plug 16 is an internally threaded sleeve 19, reduced at the outer end to receive a tubular strainer member 20, the sleeve having wrench receiving faces and thus operating as a nut to clamp the member 16 and 19 in position.

The plug 16 is longitudinally bored as shown at 21, with a valve seat at the outer end of the bore to receive a valve 22.

The stem of the valve is represented at 23 and extends through the bore 16 of the plug and terminates in an eye 24 within the supply chamber.

Extending from the flange 17 of the plug 16 is a bracket 25 to which a bell crank lever 26 is pivoted at 27, as shown.

One arm of the lever 26 is pierced to receive the eye 24 of the valve stem 23, while the other arm of the lever is pierced to receive an eye 28 of a rod 29, the latter supporting a float 30.

By this arrangement it will be obvious that the inflow of water through the intake screen 20 will be automatically controlled and maintained at a uniform stage in the troughs, and the stage of water automatically restored when lowered in the troughs when consumed by the animals, as will be obvious.

Figure 6:
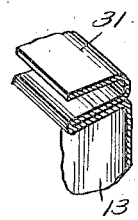
Figs. 6 and 7 are enlarged details illustrating the construction of the guides for the supply tank closure.
Figure 7:
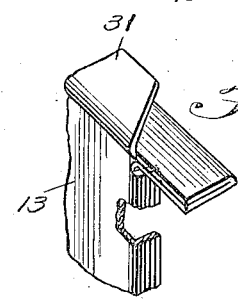
Figure 2:
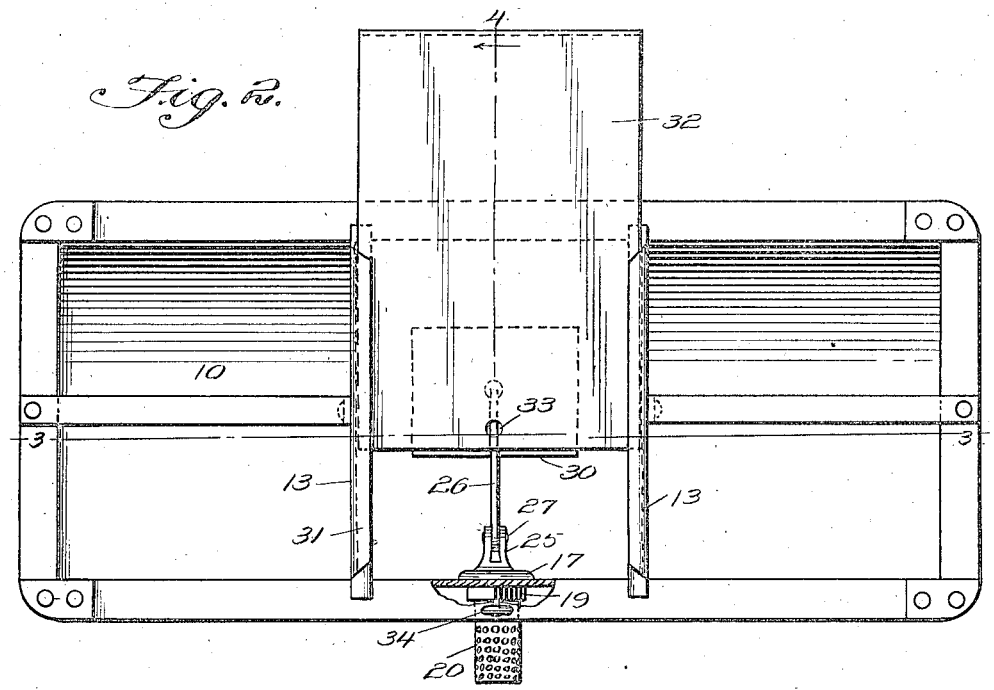
Fig. 2 is a plan view with the supply tank cover partly removed.
Figure 3:
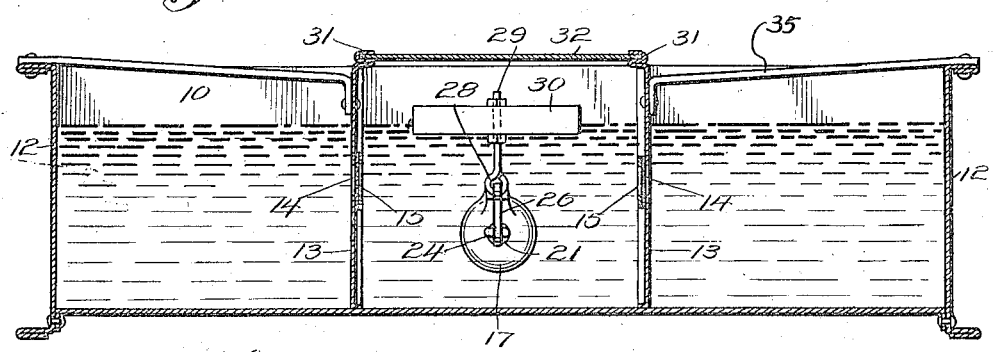
Fig. 3 is a longitudinal section on the line 3—3 of Fig. 4.
Figure 4:
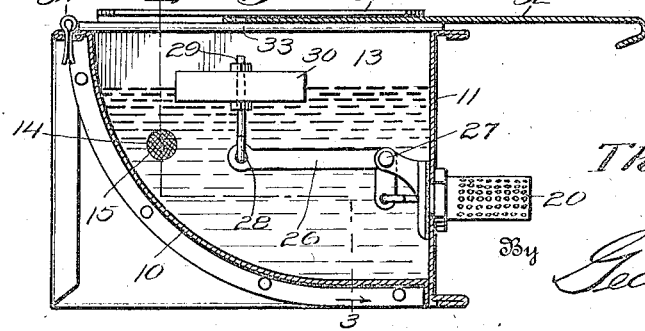
Fig. 4 is a transverse section on the line 4—4 of Fig. 2.

At their upper edges the partitions 13 are bent into guideways 31 for a closure member 32, the latter having an aperture 33 to receive a cotter pin 34, or other holding device to prevent accidental displacement of the closure. The material of each of the partitions next to the guideways 31 is folded upon itself as indicated in Figures 1, 6 and 7, and the folded over portion extended to bear over the upper edges or rims of the side portions of the shell, to support the partitions in position.

Guard members 35 are attached to the end members 12 and partitions 13, to prevent the animals from getting into the troughs, while at the same time the presence of the guard does not prevent the animals from drinking in the natural manner.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention what is claimed as new is:—

In a stock watering device, an oblong shell open at the top, transverse partitions within said shell to form the interior of the shell compartments and each partition having a transverse aperture near the top formed with a portion folded over upon itself and the folded over portion extended beyond the body of the partition at the front and rear to form supports to bear upon the front and rear rims of the shell and operating to maintain the partition in position, the portions of the partitions above the folded over portions being bent to form guideways for a closure for one of the compartments.

In testimony whereof, I affix my signature hereto.

THOMAS RITCHIE.